US009767436B2

(12) United States Patent
Chenoweth et al.

(10) Patent No.: US 9,767,436 B2
(45) Date of Patent: Sep. 19, 2017

(54) SYSTEM FOR MANAGING FORMAL MENTORING PROGRAMS

(75) Inventors: Kathi Lynn Chenoweth, Schererville, IN (US); Marcelyn Van Houten, Walnut Creek, CA (US); Louise Diana Barnfield, San Carlos, CA (US); Klaus Borho, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 13/100,142

(22) Filed: May 3, 2011

(65) Prior Publication Data

US 2012/0282576 A1 Nov. 8, 2012

(51) Int. Cl.
*G06Q 10/10* (2012.01)
*G09B 19/00* (2006.01)
*G09B 19/18* (2006.01)

(52) U.S. Cl.
CPC ........... *G06Q 10/105* (2013.01); *G09B 19/00* (2013.01); *G09B 19/18* (2013.01)

(58) Field of Classification Search
CPC ........... G06Q 10/06; G06Q 10/063112; G06Q 10/105; G06Q 50/01; G06Q 10/06311; G06Q 10/06312; G06Q 50/205
USPC .................................. 434/219, 107
See application file for complete search history.

(56) References Cited

U.S. PATENT DOCUMENTS

| | | | |
|---|---|---|---|
| 5,727,950 A | 3/1998 | Cook et al. | |
| 5,862,223 A | 1/1999 | Walker et al. | |
| 5,915,244 A * | 6/1999 | Jack et al. | 705/14.17 |
| 6,527,556 B1 | 3/2003 | Koskinen | |
| 6,829,585 B1 | 12/2004 | Grewal et al. | |
| 6,871,195 B2 | 3/2005 | Ryan et al. | |
| 7,120,647 B2 | 10/2006 | Venkatesh et al. | |
| 7,769,624 B1 | 8/2010 | Armentano | |

(Continued)

FOREIGN PATENT DOCUMENTS

WO WO2010054370 A1 5/2010

OTHER PUBLICATIONS iMentor Interactive, obtained at http://www.imentor.org/imentor-interactive; Dec. 9, 2010; 1 page.

(Continued)

*Primary Examiner* — Nathan Hillery
(74) *Attorney, Agent, or Firm* — Trellis IP Law Group, PC (57) ABSTRACT

A system and method for facilitating mentoring in an enterprise. An example method includes establishing a set of candidate mentors and a set of candidate mentees; providing a first user option to match a candidate mentor with a candidate mentee from the set of candidate mentors and the set of candidate mentees, respectively, yielding a mentor and an associated mentee in response thereto; selectively tracking a first performance parameter of the mentee over an interval during which a mentoring relationship exists between the mentor and the mentee and providing an indication of a change in the first performance parameter over time; and providing a second user option to initiate an action in response to the indication. The action may include initiating an adjustment in compensation for the mentee or mentor when the indication indicates a particular improvement in one or more performance parameter(s).

18 Claims, 7 Drawing Sheets

(56) References Cited

U.S. PATENT DOCUMENTS

| | | | |
|---|---|---|---|
| 2002/0077884 A1 | 6/2002 | Sketch | |
| 2004/0029087 A1* | 2/2004 | White | 434/219 |
| 2004/0081951 A1* | 4/2004 | Vigue et al. | 434/350 |
| 2005/0044197 A1* | 2/2005 | Lai | 709/223 |
| 2005/0091095 A1 | 4/2005 | Wilbrink et al. | |
| 2005/0282126 A1* | 12/2005 | Pesso | 434/236 |
| 2006/0031087 A1 | 2/2006 | Fox et al. | |
| 2007/0100595 A1* | 5/2007 | Earles et al. | 703/13 |
| 2007/0156659 A1* | 7/2007 | Lim | 707/3 |
| 2008/0004970 A1* | 1/2008 | Ehrensberger et al. | 705/26 |
| 2008/0114838 A1 | 5/2008 | Taylor | |
| 2008/0313000 A1* | 12/2008 | Degeratu et al. | 705/8 |
| 2010/0103779 A1 | 4/2010 | Kakirde et al. | |
| 2010/0114672 A1 | 5/2010 | Klaus et al. | |
| 2010/0120011 A1* | 5/2010 | O'Brien | 434/362 |
| 2010/0198659 A1 | 8/2010 | Meltzer et al. | |
| 2010/0293126 A1* | 11/2010 | Lang et al. | 706/46 |
| 2011/0236870 A1* | 9/2011 | Chinosornvatana et al. | 434/322 |
| 2011/0306029 A1* | 12/2011 | Prince | 434/350 |
| 2013/0110565 A1* | 5/2013 | Means et al. | 705/7.11 |

OTHER PUBLICATIONS

National Mentoring Partnership; obtained at http://www.mentoring.ca.gov/pdf/e-mentor_facesheet.pdf; downloaded circa Dec. 9, 2010; 2 pages.

Priest, Curtiss W.; "Building Worldwide Mentoring Tools: Content Analysis of Visited Web Page and Matching"; Aug. 21, 2002; 4 pages.

Taleo Performance—Large Enterprise Employee Performance Management; obtained at http://www.taleo.com/solutions/taleo-enterprise-performance; May 31, 2011; 2 pages.

Blue/360—Help Your Employees Develop More Fully; obtained at http://www.explorance.com/prod_360.asp?gclid=ClzTh660hqkCFQlmbAodgR8cpw; May 31, 2011; 1 page.

* cited by examiner

SYSTEM FOR MANAGING FORMAL MENTORING PROGRAMS

BACKGROUND

The present application relates to software and more specifically to systems and methods for facilitating mentoring activities and relationships.

Mentoring systems and methods are particularly important in enterprise applications, where enhanced employee knowledge and skill obtained via a mentoring program may improve enterprise efficiency and profitability.

Conventionally, enterprise mentoring programs are implemented and managed manually by Human Resources (HR) department personnel. Employees of an HR department may manually select mentors and match them with mentees. The HR department may then facilitate exchange of contact information between the mentors and mentees. Electronic communications between mentors and mentees may then be monitored by HR.

However, HR departments often lack efficient standardized tools for initiating, cultivating, supporting, and monitoring mentoring relationships. Consequently, enterprises often lack important knowledge, such as which employees are effective mentors, which employees wish to be mentors, which employees which to be mentored, and so on. Furthermore, the dearth of effective enterprise mentoring tools may inhibit overall corporate goal attainment, as employee potential is not fully realized.

SUMMARY

An example method for facilitating mentoring in an enterprise includes establishing a set of candidate mentors and a set of candidate mentees; providing a first user option to match a candidate mentor with a candidate mentee from the set of candidate mentors and the set of candidate mentees, respectively, yielding a mentor and an associated mentee in response thereto; selectively tracking a first performance parameter of the mentee over an interval during which a mentoring relationship exists and providing an indication of a change in the first performance parameter over time; and providing a second user option to initiate an action in response to the indication.

In an illustrative embodiment, the action includes initiating an increase in compensation for the mentee or mentor when the indication indicates an improvement in a particular performance parameter, wherein the improvement results in the performance parameter exceeding a predetermined criterion. Alternatively, or in addition, the action includes adjusting or providing a user option for adjusting a performance rating of the mentor based on the indication.

The example method further includes providing a collaborative user interface for enabling a mentor to communicate with a mentee. The collaborative user interface may include a third user option to assign one or more tasks to a mentee, and a fourth user option to rate a performance of the mentee, resulting in a second performance parameter.

Profile information pertaining to a profile of each candidate mentor and each candidate mentee may be retrieved from an Enterprise Resource Planning (ERP) application to a mentoring system. The ERP application may include a talent management application. The profile information may include an indication of the first performance parameter pertaining to each candidate mentee and candidate mentor. The first performance parameter may include, for example, a measure of quota attainment pertaining to each candidate mentee who is a salesperson.

A fifth user option enables filtering of set of enterprise personnel based on one or more predetermined criteria to yield an initial set of candidate mentors and an initial set of candidate mentees. The one or more predetermined criteria may include an indication of a particular skill or knowledge or lack thereof. A sixth user option enables a candidate mentor or mentee to associate one or more search tags with themselves. Example search tags may specify available time intervals for mentoring, a location of the candidate mentor, and so on. A seventh user option enables a candidate mentor to indicate that they are not available to be a mentor. Additional user options enable candidate mentors and mentees to perform searches for candidate mentees and mentors, respectively, who meet one or more search criteria pertaining to one or more tags.

The novel design of certain embodiments discussed herein is facilitated by software mechanisms for enabling tracking the effectiveness of mentoring, such as by monitoring changes in performance metrics or scores over time or other indicators that may suggest that a participant in a mentoring program is improving their ability to contribute to the overall enterprise goals.

Furthermore, certain embodiments disclosed herein may enable Hunan Resources (HR) personnel to have improved visibility into both informal and formal mentoring relationships; to have efficient mechanisms for accessing mentoring effectiveness; to have effective mechanisms for providing incentives, such as compensation for participation and improved work performance; to facilitate mentors and mentees finding each other, and so on.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

While the present application is discussed with respect to business mentoring systems that interface with or otherwise leverage Enterprise Resource Planning (ERP) software, embodiments are not limited thereto. For example, any learning environment, such as a university, non-profit organization, government, or the Internet in general, may benefit from a system for facilitating matching mentors with mentees and tracking subsequent changes in performance parameters of participants and initiating actions in response thereto in accordance with embodiments discussed herein.

For the purposes of the present discussion, an enterprise may be any organization of persons, such as a business, university, government, military, and so on. The terms "organization" and "enterprise" are employed interchangeably herein. Personnel of an organization or enterprise, i.e., enterprise personnel, may include any persons associated with the organization, such as employees, contractors, board members, and so on.

A mentoring relationship may be any association between two or more entities for the purpose of transferring knowledge or enhancing skill of one or more of the entities. Mentoring activities may include providing advice and support to facilitate career development, goal attainment, and so on. A mentoring system may be any collection of one or more software applications or components for initiating, monitoring, and/or otherwise facilitating mentoring relationships. The terms "mentoring system" and "mentoring program" are employed interchangeably herein.

A mentor (also called a teacher, instructor, guide, or expert herein) may be any person that is providing knowledge, guidance, or other instruction as a participant in a mentoring relationship. Similarly, a mentee (also called a student or protégé herein) may be a participant in a mentoring relationship who is being instructed, guided, or is otherwise receiving information from a mentor. A candidate mentor may be a person who is being considered (by anyone) to act as a mentor. In certain embodiments discussed herein, a candidate mentor may indicate a willingness to be a mentor. Similarly, a candidate mentee is a person who is being considered, e.g., by an administrator or other enterprise personnel, to act as a mentee. In certain embodiments discussed herein, a candidate mentee may indicate a willingness to be a mentee, i.e., to participate in a mentoring program and receive instruction from a mentor.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
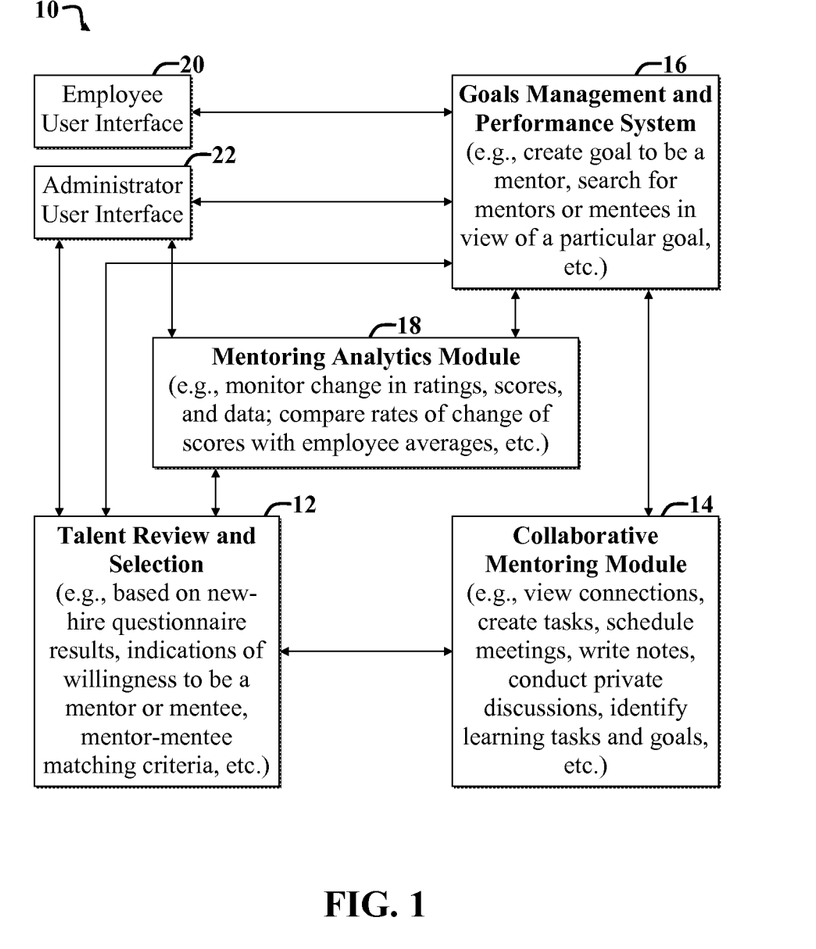
FIG. 1 is a diagram of a first example embodiment of an enterprise mentoring system.

FIG. 1 is a diagram of a first example embodiment of an enterprise mentoring system 10. The example system 10 includes a talent review and selection module 12, which communicates with a collaborative mentoring module 14. Both the talent review and selection module 12 and the collaborative mentoring module 14. The collaborative mentoring module 14 communicates with a goals management and performance system 16. An analytics module 18 communicates with the goals management and performance system 16 and the talent review and selection module 12.

For illustrative purposes, an administrator user interface 22 is shown communicating with the talent review and selection module 12. An employee user interface 20 communicates with the goals management and performance system 16. Note that the user interfaces 20, 22 may include both software and hardware, such as Graphical User Interface (GUI) software for rendering display screens, and monitors, keyboards, and so on, for interacting with the GUI.

In an example operative scenario, an administrator, such as a manager with administrator access rights and permissions, may log into the system 10 via the administrator user interface 22. The talent review and selection module 12 includes one or more routines, i.e., computer code, for accessing data pertaining to employees of the associated enterprise. The talent review and selection module 12 may be implemented, for example, in combination with the teachings of U.S. patent application Ser. No. 13/104,813, entitled SYSTEM FOR AUTOMATED SALES TEAM IDENTIFICATION AND/OR CREATION, filed on May 10, 2011, which is herein incorporated by reference in full.

In the present example operative scenario, an administrator, such as a manager, employs functionality provided by the talent review and selection module 12 to filter employees, yielding candidate mentors and candidate mentees. The filtering may be based on performance parameters or other criteria associated with each enterprise employee or other personnel. Such performance parameters or criteria may be retrieved from preexisting ERP software applications, such as Human Capital Management (HCM), Incentive Compensation (IC) systems, Customer Relationship Management (CRM) systems, and so on. Alternatively, or in addition, the talent review and selection module 12 may be implemented as a component, such as a talent management software component, of an existing ERP software application.

For the purposes of the present discussion, ERP software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components.

A talent management system or application may be any software application or functionality for facilitating selecting, organizing, or managing enterprise personnel or tasks performed thereby. Personnel of an organization may include any persons associated with the organization, such as employees, contractors, board members, and so on. Talent management systems, also called personnel management systems herein, may be employed in various applications, including, but not limited to, hiring enterprise personnel, determining compensation, developing capabilities, utilizing capabilities, and constructing, organizing, and managing sales teams and associated tasks.

An Incentive Compensation (IC) system, also called a compensation management system, may be any collection of software components, such as a database, adapted to facilitate managing and allotting compensation and incentives to persons associated with an enterprise. Examples of compensation include salaries, commissions, retirement benefits, healthcare programs, vacation allotment, and so on. Examples of incentives include offers to increase or decrease compensation based on individual performance.

A Customer Relationship Management (CRM) system may be any software that is adapted to facilitate managing, organizing, or controlling business process, such as sales activities, involving customers. Certain CRM systems may track sales performance, such as quota attainment consistency, frequency, and/or track record of enterprise employees.

A Human Capital Management (HCM) system, also called a human resource management system, may be any software that is adapted to facilitate managing persons of an enterprise. Certain HCM systems are adapted to facilitate hiring, retaining, using and developing capabilities of enterprise personnel, and so on. Note that various types of systems may include other system. For example certain HCM systems may include IC systems and talent management systems as components thereof. Page: 9

Data maintained via the talent review and selection module 12 may include additional data obtained from questionnaires completed by newly hired persons, and/or additional data provided via the employee user interface 20, as discussed more fully below. For example, the employee user interface 20 may be adapted to enable candidate mentors and mentees to add descriptors or tags associated with themselves to facilitate the matching process between mentors and mentees. Examples of tags include indications as to whether a candidate mentor is willing to mentor; indications as to whether a candidate mentee is willing to be mentored; locations of candidate mentors and mentees; areas of expertise, and so on.

In the present specific embodiment, the talent review and selection module 12 includes additional code for enabling an administrator, via the user interface 22, to assign a mentor to a mentee and vice versa. The talent review and selection module 12 may be adapted to suggest mentor-mentee matches based on a predetermined matching algorithm. In an example scenario, the matching algorithm uses parameters, i.e., criteria, such as location, availability, subject mater, social network relations, performance parameters, and so on to suggest a match. Exact details of the matching algorithm are implementation specific. Those skilled in the art with access to the present teachings may readily determine and implement a matching algorithm to meet the needs of a given implementation without undue experimentation.

For the purposes of the present discussion, a formal mentoring relationship may be any mentoring relationship wherein the mentor and the mentee are matched by a third party, such as an administrator. The general content, goals, tasks, and/or direction of the formal mentoring relationship may, in certain cases, be guided by the administrator. Hence, when an administrator employs the administrator user interface 22 and associated talent review and selection module 12 to assign a mentor to a mentee and vice versa, the resulting mentoring relationship is called a formal mentoring relationship.

An informal mentoring relationship may be any mentoring relationship wherein the mentor and mentee form a relationship themselves, i.e., match themselves. In certain cases, the content and direction of the informal mentoring relationship is determined by the mentor and/or mentee. Hence, when employees (or other enterprise personnel) use the employee user interface 20 to select and form mentoring relationships, the resulting mentoring relationships are called informal mentoring relationships. Both informal and formal mentoring relationships may be tracked via the collaborative mentoring module 14 in communication with the talent review and selection module 12.

In the present operative scenario, an administrator has employed the talent review and selection module 12 to determine an initial set of matches between mentors and mentees. Information pertaining to these qualified, i.e., filtered matches, which may have been selected by the talent review and selection module 12 and approved by the administrator, is forwarded to the goals management and performance system 16.

The goals management and performance system 16 includes computer code for interfacing the employee user interface 20 with the collaborative mentoring module 14. The goals management and performance system 16 also provides functionality for enabling employees to, for example, set goals consistent with enterprise goals. The goal information may be fed back to the talent review and selection module 12 to facilitate matching mentors with mentees. Additional functionality and associated computer code, such as for enabling a user to specify a goal to be a mentor; for enabling searching for mentors and mentees; for enabling a user to specify a willingness to be mentored, and so on, may be implemented via the goals management and performance system 16.

After a mentoring relationship is established, such as via an administrator employing the administrator user interface 22 and/or via employees using the employee user interface 20, the resulting mentor and mentee may work together via a collaborative workspace. Collaborative workspace functionality may be implemented via the collaborative mentoring module 14. The collaborative mentoring module 14 is adapted to enable users, such as mentors and mentees to create tasks, schedule meetings, write notes, discuss topics privately, discuss learning goals and aspirations, and so on. Exact details for implementing shared workspace areas to facilitate collaboration, are implementation specific. Those skilled in the art with access to the present teachings may readily implement appropriate functionality to meet the needs of a given implementation without undue experimentation.

In the present operative scenario, if an administrator has not assigned a particular employee to a mentoring relationship, the particular employee may select their own relationship if desired. For example, an employee that has logged into the goals management and performance system 16 via the employee user interface 20 may choose to select a mentor or a mentee. A set of prequalified mentors and/or mentees based on matching performed via an administrator (or performed automatically) via the talent review and selection module 12, may be displayed for or otherwise accessible to each employee logging in to the goals management and performance system 16. Further searches may be made, or other options may be provided, to enable employees to efficiently establish mentoring relationships. Alternatively, the initial set of mentors and/or mentees may comprise the set of all enterprise personnel, less enterprise personnel who have indicated that they do not wish to be a mentor or mentee.

In addition, mentor-mentee matches that are forwarded from the talent review and selection system 12 may be categorized according to preexisting enterprise goals. Details pertaining to preexisting enterprise goals are maintained via the goals management and performance system 16. For example, if a particular mentor-mentee relationship pertains to improving a mentee's sales performance, then this relationship may be assigned to a particular sales department goal. When an employee uses the employee user interface 20 to log into the goals management and performance system 16, the employee may see preselected candidate mentors, which the employee may choose from to initiate a mentoring relationship in view of achieving a particular goal.

Mentoring activities pertaining to different mentoring relationships may be monitored by an administrator via the administrator user interface 22 and talent review and selection module 12, which communicates with the collaborative mentoring module 14. In addition, the mentoring analytics module 18, which communicates with the goals management and performance system 16 and the talent review and selection module 12, is adapted to track changes in employee ratings and data, including those participating in mentoring programs. The ratings and data, which may include one or more performance parameters, may be retrieved by the mentoring analytics module 18 from the goals management and performance system 16, the talent review and selection module 12, and/or via another sources, such as another ERP application. In addition, ratings that mentors have given to mentees and vice versa (e.g., via the employee user interface 20) may be collected by the mentoring analytics module 18. The mentoring analytics module 18 may include code for generating graphs and charts, which may be displayed to an administrator using the administrator user interface 22 to access the talent review and selection module 12.

Alternatively, or in addition to retrieving data and performance parameters, the mentoring analytics module 18 may be adapted to compute performance ratings in accordance with a predetermined computation formula based on retrieved data. The computed performance ratings may be compared with those of other enterprise personnel. In addition, relative rates of change in performance parameters may also be computed and displayed.

Enterprise personnel using the employee user interface 20 to establish informal mentoring relationships may have the option to submit the resulting relationship(s) (e.g., to the talent review and selection module 12) for tracking and/or monitoring by an administrator. In addition, users may have an option to make a particular connection or mentoring relationship private or public. In certain implementations, making a mentoring relationship private will make the relationship not visible to other users of a social network. The social network may be implemented via or otherwise interfaced with the collaborative mentoring module 14.

The collaborative mentoring module 14 includes computer code for enabling generation of collaborative user interface functionality that is accessible via the employee user interface 20. For the purposes of the present discussion, a collaborative user interface, such as a group space, may be any user interface display screen or mechanism whereby plural users may simultaneously access the user interface display screen or mechanism. In general, in embodiments discussed herein, persons involved in a mentoring program implemented via the system 10, or persons who are otherwise part of a particular team or enterprise social network, may be assigned a common group space, i.e., collaborative user interface to facilitate collaboration.

In addition, depending upon selected implementation details, making a mentoring relationship private may make the relationship unavailable for monitoring via an administrator. Alternatively, making a relationship private will allow monitoring by an administrator but will make the relationship not accessible or viewable to other participants of the social network. Exact details as to how such "make private" functionality works are implementation specific. Those skilled in the art with access to the present teachings may readily implement appropriate functionality to meet the needs of a given implementation without undue experimentation.

In the present specific embodiment, employees and/or other enterprise personnel may have additional incentives to participate in mentoring relationships and associated programs and to have their relationships monitored by an administrator. For example, the talent review and selection module 12 may track changes in performance of a mentee relative to a general population of enterprise personnel. Substantial changes, i.e., changes in performance parameters exceeding one or more predetermined thresholds, may cause automatic generation of a signal or alert, which is viewable by an administrator via the administrator user interface 22. The signal or alert may be a system-generated recommendation for a raise or other increase in compensation (e.g., a bonus) to reward the performance of a mentee and/or an associated mentor. Furthermore, the administrator may adjust one or more additional performance parameters based on the indication. For example, and administrator observing that a mentee has rapidly improved in a particular knowledge area may adjust or increase a versatility metric (or other measurement) pertaining to the mentee. The adjusted metric may be stored in association with an employee profile pertaining to the mentee. The resulting information stored in the employee profile may then be used by other ERP modules, such as an incentive compensation system. Similarly, a mentor may be flagged for an increase in compensation when the performance of an associated mentee increases faster than a predetermined threshold rate or measurement.

For the purposes of the present discussion, a performance parameter, also called a performance metric, may be any measurement or other indicator associated with a person or thing. Examples of metrics include sales performance scores, versatility levels, rates of changes of performance scores, and so on. A versatility measurement of a person may be any measurement quantifying the persons ability to adapt to various work environments or to accomplish a new set of enterprise objectives or tasks. A performance score, such as a metric indicating sales quota performance consistency, may be any measurement indicating or estimating a person's ability to accomplish one or more tasks and/or goals based on historical data.

Hence, unlike conventional mentoring systems, which often lack built in mechanisms for encouraging and rewarding participation, certain embodiments disclosed herein may facilitate compensating participants for not just participation in a mentoring system, but for improved performance occurring simultaneously with participation in the mentoring system or program 10. Compensation mechanisms may be automatic or may be reviewed by an administrator. Recommendations for increases in compensation may be forwarded directly from the talent review and selection system 12 to an Incentive Compensation (IC) ERP application (and/or other ERP application) or may first be passed to an administrator via the administrator user interface 22.

While various modules of FIG. 1 are shown as separate modules, those skilled in the art will appreciate that the various modules may be combined into a single module on a single machine; may be integrated with preexisting ERP software; may be implemented as a distributed application that is distributed across a network, and so on, without departing from the scope of the present teachings. Furthermore, various connections between modules are illustrative only. Other connections may be provided. For example, the administrator user GUI and hardware 22 may interface directly with the goals management and performance system 16, the collaborative mentoring module 14, the mentoring analytics module 18, and so on.

Figure 2:
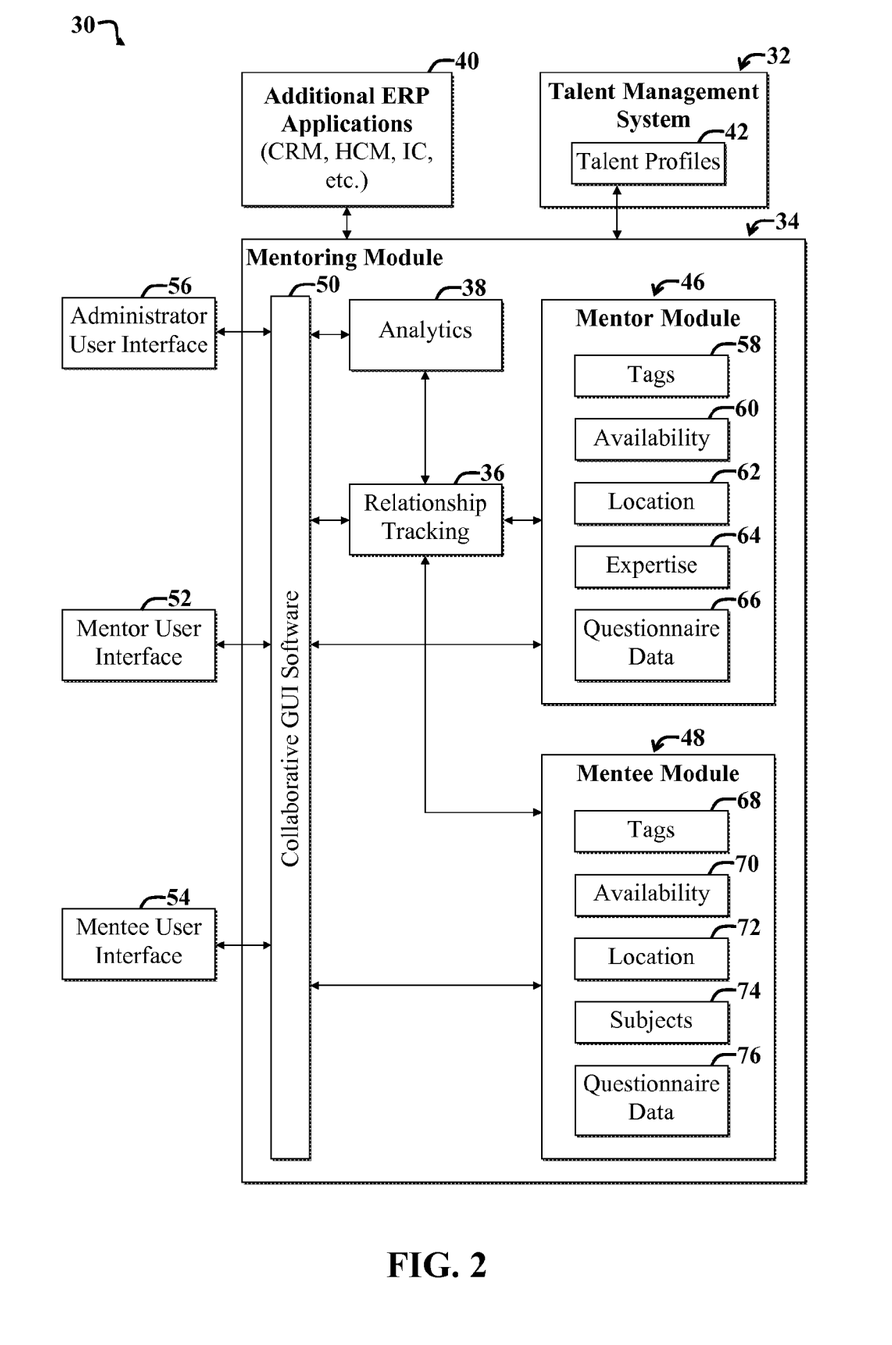
FIG. 2 is a diagram of a second example embodiment of an enterprise mentoring system.

FIG. 2 is a diagram of a second example embodiment of an enterprise mentoring system 30. The alternative enterprise mentoring system 30 is shown leveraging information, such as employee talent profile information 42, available via preexisting ERP software applications. For illustrative purposes, the preexisting ERP software applications are shown including a talent management application 32, which accommodates the talent profile information 42, and communicates with additional ERP applications 40. The additional ERP applications 40 may include, for example, CRM, HCM, and IC systems.

A mentoring module 34 includes collaborative user interface GUI software 50, which is accessible via a mentor user interface 52 and a mentee user interface 54. The collaborative GUI software further communicates with a mentor module 46 and a mentee module 48. The mentor module 46 stores information and functionality pertaining to mentors. The information and functionality may be retrieved by the mentoring module 34 from the ERP applications, such as the talent profiles 42 of the talent management software 42. In addition, certain information and functionality may be populated via a mentor employing the mentor user interface 52. For example, the mentor user interface 52 and accompanying collaborative GUI software 50 may be adapted to enable a mentor to tag themselves via tags 58; to set their availability status and times 60; to specify desired physical mentoring locations 62; to specify particular expertise levels and areas 64, such as specific knowledge areas or subject matter; to specify answers to questionnaires 66; and so on.

Similarly, the mentee module 48 stores information and functionality pertaining to mentees. For example, a mentee may employ the mentee user interface software 54 and accompanying collaborative GUI software 50 to tag themselves via search tags 68; to establish or set availability for being mentored 70; to set preferred location(s) 72 to be mentored; to select subjects or topics 74 on which to be mentored; to provide answers to questionnaires 76, and so on.

Candidate mentors and mentees may employ the user interfaces 52, 54 to search for appropriate mentees and mentors, respectively, and to thereby establish one or more mentoring relationships. Once one or more mentoring relationships are established, the relationship tracking module 36 is adapted to monitor the progress of the relationships. Progress monitoring may include noting when a relationship begins and ends, whether predetermined tasks have been completed, what performance ratings mentors have assigned to mentees, and so on. Exact details as to what aspects of a mentoring relationship are tracked are implementation specific and may vary depending upon the needs of a given implementation.

The analytics module 38 includes computer code for selectively retrieving relationship data from the relationship tracking module 36 for incorporation into analytic measurements as needed. Analytic measurements may include changes in predetermined performance measurements associated with mentors and mentees, and so on. Note that certain performance metrics, such as sales quota attainment, may be tracked by other ERP systems, such as an HCM system included in the additional ERP applications 40. The analytics module 38 may selectively pull data from the additional ERP applications 40 to calculate analytics. Similarly, the analytics module 38 may forward calculated analytics measurements to the ERP applications 32, 40 for storage in association with a mentor and/or mentee.

In an example operative scenario, a sales person employs the mentee user interface 54 to establish a mentoring relationship with a selected mentor with the intent to improve sales performance, e.g., as measured by sales quota performance measurements. A sales quota performance measurement may be any metric that is a function of how frequently a sales person meets a sales quota and/or by what margin.

The ERP applications 40 may track sales quota attainment data for all sales persons of the enterprise that is employing the mentoring system 30. Accordingly, the analytics module 38 may calculate a rate of change in the sales quota attainment metric for a given mentee relative to all other sales employees to note a relative improvement in the metric in response to participation in a mentoring program. If a mentee's sales quota substantially increases relative to other employees, this may indicate that the mentoring system 30 is achieving a degree of success. Furthermore, the analytics module 38 may be employed to generate graphs or other visualizations for graphically displaying one or more performance metrics as a function of time and/or as a function of another predetermined metric, as discussed more fully below.

An administrator employing the administrator user interface 56 may then view these metrics and determine whether to recommend increased compensation to the mentee and/or mentor showing improved performance. This may facilitate providing incentives for employees to participate in the mentoring system 30.

Alternatively, or in addition, the analytics module 38 may run computer code for automatically generating a recommendation for increased compensation for one or more of the mentees and/or mentors whose data is maintained via the mentor module 46 and/or mentee module 48. In addition, in the present embodiment, mentors and mentees may optionally view certain relationship tracking information by the relationship tracking module 36, which communicates with the GUI software 50, which communicates with the mentor user interface 52 and the mentee user interface 54.

Hence, the analytics module 38 may facilitate graphically depicting performance parameters for a mentee and/or mentor and may further facilitate graphically depicting changes in the performance parameters.

Mentors and mentees may employ the user interfaces 52, 54 to enter search queries to locate each other and establish mentoring relationships. Alternatively, or in addition, an administrator with access to the administrator user interface 56 may approve and/or select matches between candidate mentors and mentees to thereby establish mentoring relationships between mentees and mentors.

In certain implementations, the system 30 may operate in one of plural modes. The administrator user interface 56 may include user interface controls for enabling an administrator to set the operational mode of the system 30. For example, in one operational mode, all candidate mentor-mentee matches are selected or otherwise determined by an administrator. In another operational mode, all candidate mentor-mentee matches are selected or otherwise determined by candidate mentors and candidate mentees. In this case, mentors and mentees may selectively submit the associated mentoring relationship for monitoring via an administrator employing the administrator user interface 56. The relationship may be submitted to the administrator user interface 56 via the GUI software 50. In a third operational mode, mentors and mentees may be selected for a mentoring relationship by an administrator or the candidate mentors and mentees.

Figure 3:
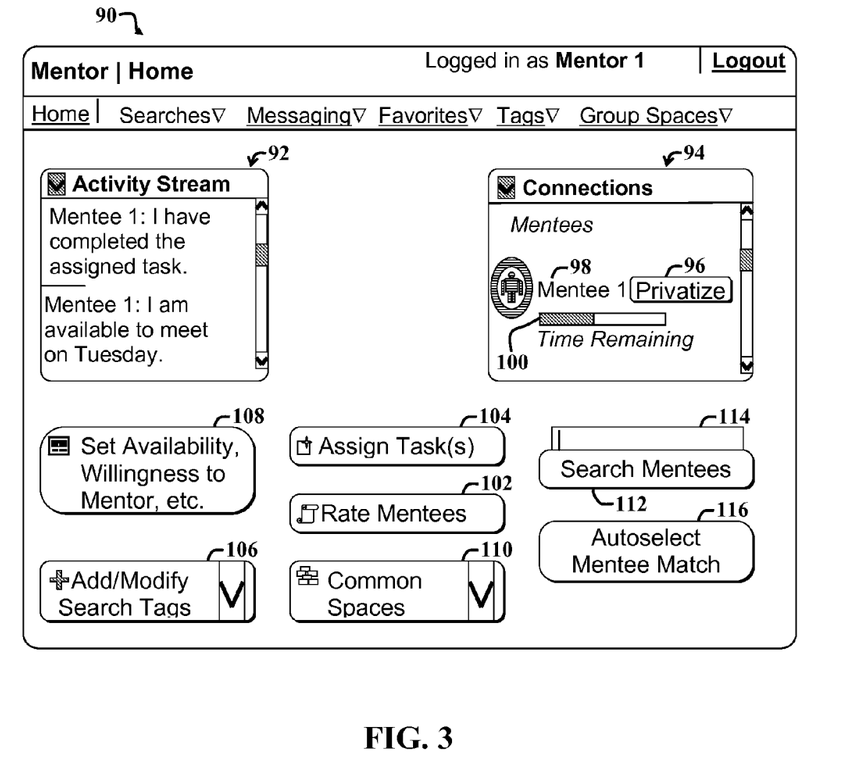
FIG. 3 is a diagram of an example mentor user interface display screen adapted for use with the systems of FIGS. 1-2.

FIG. 3 is a diagram of an example mentor user interface display screen 90 adapted for use with the systems 10, 40 of FIGS. 1-2. The example administrator user interface display screen 90 includes a connections area 94 for indicating persons in a particular mentor's social network. In the present example, the mentor employing the user interface display screen 90 includes a mentee 98 as a social connection. A time widget 100 indicates time remaining that the mentor has allocated for mentoring the mentee 98. A make-private user interface control 96 provides an option for a mentor to make the relationship between the mentor and the mentee 98 not visible to other persons in the social network.

A mentor may rate a particular mentee by selecting a rate-mentee user interface control 102. Selection of the rate-mentee user interface control 102 may activate another dialog box or user interface display screen, whereby a mentor may grade or otherwise provide a performance measurement or indication pertaining to a particular mentee. For example, if a mentee completes an assigned task to the mentor's satisfaction, the mentor may provide an appropriate grade for the mentee's performance by selecting the rate-mentee user interface control 102 and entering appropriate scores or other parameters.

An assign-tasks button 104 provides a user option to specify tasks, such as particular exercises, for a mentee to perform. Selection of the assign-tasks button 104 may activate another user interface display screen or dialog box, whereby a mentor may provide details pertaining to a task that is being assigned.

An activity stream 92, which may be implemented via a blog mechanism or other activity-stream mechanism, may be employed by mentors and mentees to provide updates as to what tasks they are currently working on; to provide other notes, and so on.

A search-tag user interface control 106 represents an option to access functionality for enabling a mentor to specify search tags pertaining to the mentor. For example, selection of the search-tag user interface control 106 may activate another user interface display screen or dialog box whereby a mentor may specify particular knowledge areas for which they are willing to mentor; to specify which languages the mentor speaks; to specify where the mentor is willing to meet a mentee for in person meetings, and so on. Exact search tag details are implementation specific and may vary.

A workspace-access control 110 is adapted to enable a mentor to access common electronic workspaces for mentors and mentees to meet. For example, a mentor may establish a particular workspace to share with a mentee, and this workspace may be specified and established via one or more user interface display screens or dialog boxes that may appear in response to selection of the workspace-access control 110 option.

A mentor may select an availability-establishing user interface control 108 to activate a user interface display screen or dialog box whereby the mentor may specify available times for mentoring; whether the mentor is available at all to be a mentor; how much time a mentor has remaining for mentoring tasks, and so on. Exact availability details are implementation specific and may vary among implementations.

A mentee search option 112 and accompanying search field 114 may be employed by a mentor to search for mentees with which to establish a mentoring relationship. For example, a mentor may enter a query in the field 114 and then select the corresponding mentee search option 112. Search results may be displayed in a subsequently displayed screen or dialog box.

An autoselect option 116 provides a mentor an option to have the underlying system suggest a match or to automatically match the mentor with a particular mentee. Selection of the autoselect option 116 may result in display of an additional display screen or dialog box illustrating one or more automatically selected mentees. User options may be provided to enable a mentor to approve of a particular selection made by the underlying system.

Note that various user interface controls, such as the mentee search option 112 may be implemented via other controls, and not merely buttons. For example, the mentee search option 112 may be replaced with a field whereby particular check boxes may be chosen to construct a query.

In addition, while activation of various interface controls may activate subsequent display screens or dialog boxes, alternatively appropriate windows or fields may appear within the same user interface display screen 90 as opposed to separately therefrom. For example, search results may appear in a field that is generated below the mentee search option 112 in response to selection thereof.

Figure 4:
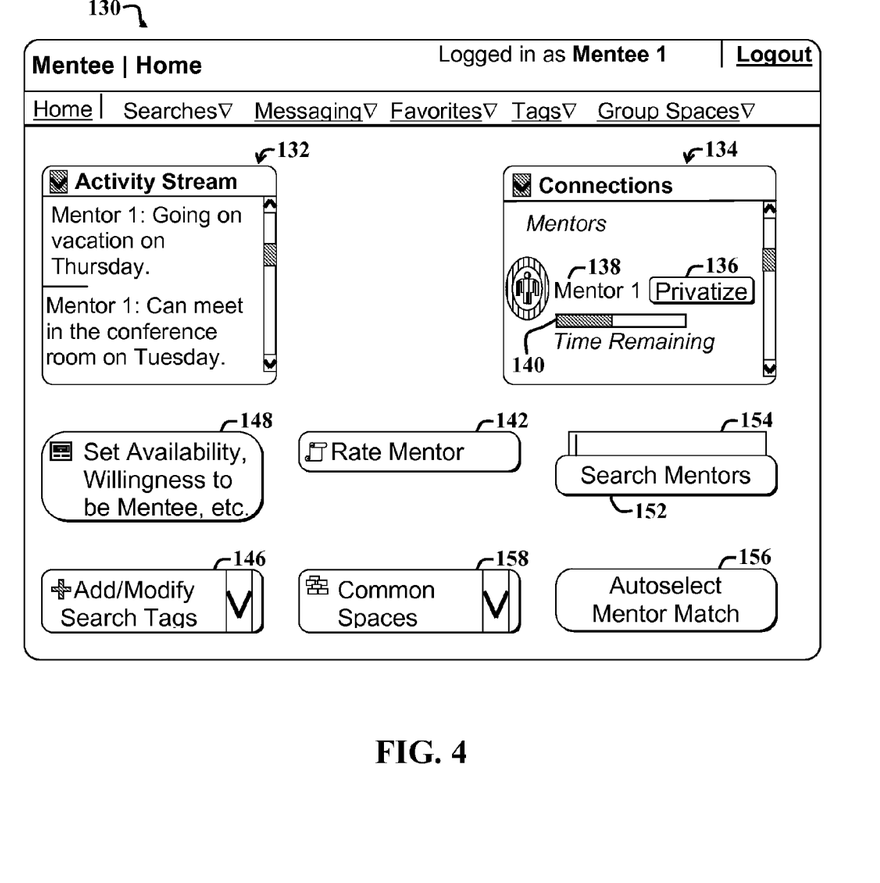
FIG. 4 is a diagram of an example mentee user interface display screen adapted for use with the systems of FIGS. 1-2.

FIG. 4 is a diagram of an example mentee user interface display screen 130 adapted for use with the systems 10, 40 of FIGS. 1-2. The example mentee user interface display screen 130 includes various user interface controls, fields, and display areas, such as an activity stream 132, a connections area 134 for displaying social network connections, a rate-mentor user option 142, a define-availability user option 148, a specify-search-tags user option 146, a search-mentors user option 152 and search field 154, and an autoselect mentor user option 156.

Various user interface components, such as the activity stream 132, connections display region 134, define-availability user option 148, and so on, of the user interface display screen 130 operate similarly to the corresponding components 92, 94, 108, respectively, of the mentor user interface display screen 90 of FIG. 3, with the exception that such functionality is accessed from the prospective of a mentee or candidate mentee.

For example, the connections area 134 illustrates an example mentor connection 138 and associated time-remaining indicator 140. The time-remaining indicator 140 may indicate how much time remaining that the mentor associated with the mentor indication 138 has available to provide mentoring services. The define-availability user option 148 may enable a candidate mentee or existing mentee to indicate times at which the mentee is available to be mentored. The specify-search-tags user option 146 may facilitate access to functionality, e.g., display screen(s) and/or dialog box(es) to enable a mentee to tag themselves for registration in an underlying search engine that conducts searches in response to selection of the search-mentee control 152 of FIG. 4 or the search-mentor control 112 of FIG. 3.

Similarly, the autoselect mentor user option 156 is adapted to cause the underlying system to select a mentor for the mentee based on predetermined knowledge about the candidate mentee and candidate mentors. The predetermined knowledge may be maintained, for example, in the talent profile information 42 of the talent management system 32 of FIG. 3.

In the present example embodiment, a mentee may also rate a particular mentor by selecting the rate-mentor user option 142 and completing one or more fields in a subsequently displayed dialog box for rating mentors. Mentor and mentee ratings may be forwarded, for example, to the relationship tracking module 36 and analytics module 38 of FIG. 2. Mentor and mentee ratings may be subsequently used as search criteria, e.g., in the search field 154, to search for mentors with which to create a mentoring relationship.

Various user interface controls for enabling a particular mentor and/or mentee to agree to forming a mentoring relationship are implementation specific. For example, in certain implementations, an informal relationship may begin by exchanging email, and the associated relationship may then be submitted for monitoring via an administrator. The resulting relationship may then appear in the mentor's and mentee's social networks. User options for messaging a particular member of the social network 134 may be implemented according to various well-known social networking user interfaces.

Figure 5:
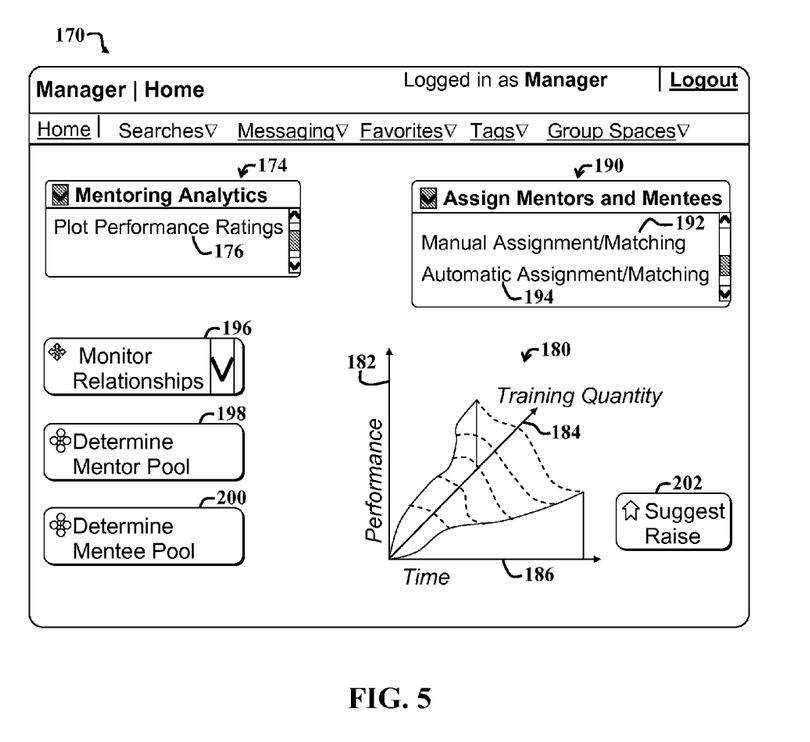
FIG. 5 is a diagram of an example administrator user interface display screen adapted for use with the systems of FIGS. 1-2.

FIG. 5 is a diagram of an example administrator user interface display screen 170 adapted for use with the systems 10, 40 of FIGS. 1-2. The example user interface display screen 170 includes a mentoring-analytics section 174. The mentoring-analytics section 174 includes a performance-metric plotting control 176, the selection of which may activate another user interface display screen or dialog box whereby an administrator may select various metrics for plotting on axis 182, 184 of a graph 180. For example, in the present example embodiment, an administrator has chosen to plot, via the graph 180, performance 182 versus training quantity 184 over time 186 for a particular mentee. An administrator may choose to plot rates of change of performance parameters or other metrics characterizing a particular mentee or mentor.

A mentor-mentee matching section 190 provides various user interface controls for enabling an administrator to match or otherwise assign a mentor to a mentee or vice versa. For example, selection of a manual assignment button 192 may activate a dialog box whereby an administrator may specify a particular match between a candidate mentor and candidate mentee to result in a mentoring relationship. Selection of an automatic assignment button 194 may trigger display of a subsequent screen or dialog box, whereby the underlying system automatically selects candidate mentors and mentees and presents proposed matches in response thereto. An administrator may then approve the system-recommended matches.

Alternatively, in certain implementations, administrator approval for a particular match is not required for the establishment of a mentoring relationship. Exact algorithms for performing automatic matching between candidate mentors and candidate mentees is implementation specific.

In an example scenario, the automatic matching includes various factors, such as relationship proximity in a social network, location of the mentor and mentee, ratings of mentors and mentees, the importance of an enterprise goal to be addressed by the mentee and/or mentor, and so on. For example, if a particular mentee is socially connected to a mentor via three degrees of separation, then a similar mentor that is connected to the mentee by one degree of separation may be considered a more preferred mentor for the mentee.

The user interface display screen 170 further includes a relationship-monitoring control 196. Selection of the relationship-monitoring control 196 may activate another user interface display screen or dialog box whereby an administrator may view predetermined information about a particular mentoring relationship. Exact details of the predetermined information are implementation specific and may vary. Examples of such predetermined information include, tasks that have been assigned by a mentor to a mentee, completion status of the tasks, when the tasks were assigned, when the mentoring relationship is scheduled to expire, and so on.

The example administrator user interface display screen 170 further includes a mentor-population selection control 198. Selection of the mentor-population selection control 198 may activate another user interface or display screen whereby a mentor may adjust a population of candidate mentors, such as by applying certain population filters, manually removing certain candidate mentors, and so on. The remaining candidate mentor population is then made available for searches, such as searches performed by the mentor search controls 152, 154 of FIG. 4.

Similarly, a mentee-population selection control 200 may activate user interface functionality whereby an administrator may filter or otherwise adjust a population of candidate mentees. The remaining filtered candidate mentees (i.e., data object representations thereof) are then made available for searches, such as via the mentee search controls 112, 114 of FIG. 3.

Furthermore, an administrator has a user option 202 to suggest a raise or other increase in compensation for a mentor or mentee after a particular graph 180 is shown indicating an increase in performance of the mentor or mentee.

Figure 6:
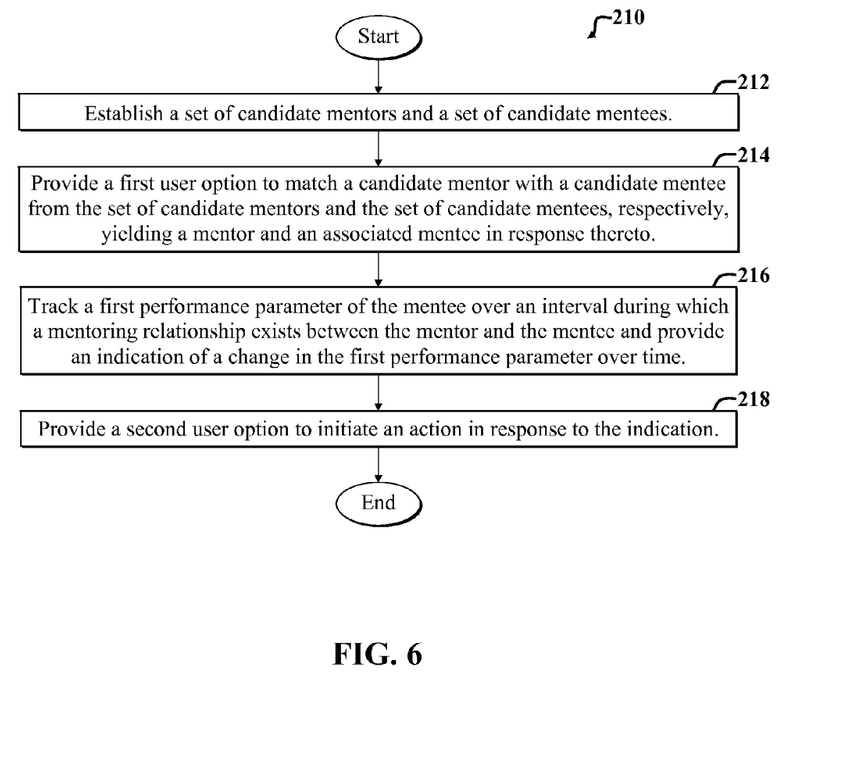
FIG. 6 is a flow diagram of a first example method adapted for use with the embodiments of FIGS. 1-5.

FIG. 6 is a flow diagram of a first example method 210 adapted for use with the embodiments of FIGS. 1-5. The method 210 includes a first step 212, which involves establishing a set of candidate mentors and a set of candidate mentees. With reference to FIGS. 2 and 6, candidate mentors and mentees represent all employee personnel whose talent profile information 42 indicates a willingness to be a mentor or mentee, respectively. The willingness of enterprise personnel to be a mentor or mentee may be established via an initial employment questionnaire and/or via the user interface display screens of FIGS. 3 and 4. The populations of candidate mentors and mentees may be further filtered, e.g., in response to an administrator selecting the determine-mentor pool control 198 or the determine-mentee pool control 200 of FIG. 5.

A second step 214 includes providing a first user option to match a candidate mentor with a candidate mentee from the set of candidate mentors and the set of candidate mentees, respectively, yielding a mentor and an associated mentee in response thereto. The first user option may be implemented via various user interface controls, examples of which are provided in the user interface display screens of FIGS. 3-5. Examples of such controls include the search-mentee controls 112, 114 and autoselect mentee match control 116 of FIG. 3; the search-mentors controls 152, 154, and autoselect mentor match control 156 of FIG. 4; and the assign mentors and mentees section 190 of FIG. 5.

A third step 216 includes selectively tracking a first performance parameter of the mentee over an interval during which a mentoring relationship exists between the mentor and the mentee and providing an indication of a change in the first performance parameter over time. The indication may be provided, for example, by the graph 180 of the administrator user interface display screen 170 of FIG. 5.

A fourth step 218 includes providing a second user option to initiate an action in response to the indication. The action may include, for example, suggesting a raise or an increase in compensation via selection of the compensation user interface control 202 of FIG. 5.

Figure 7:
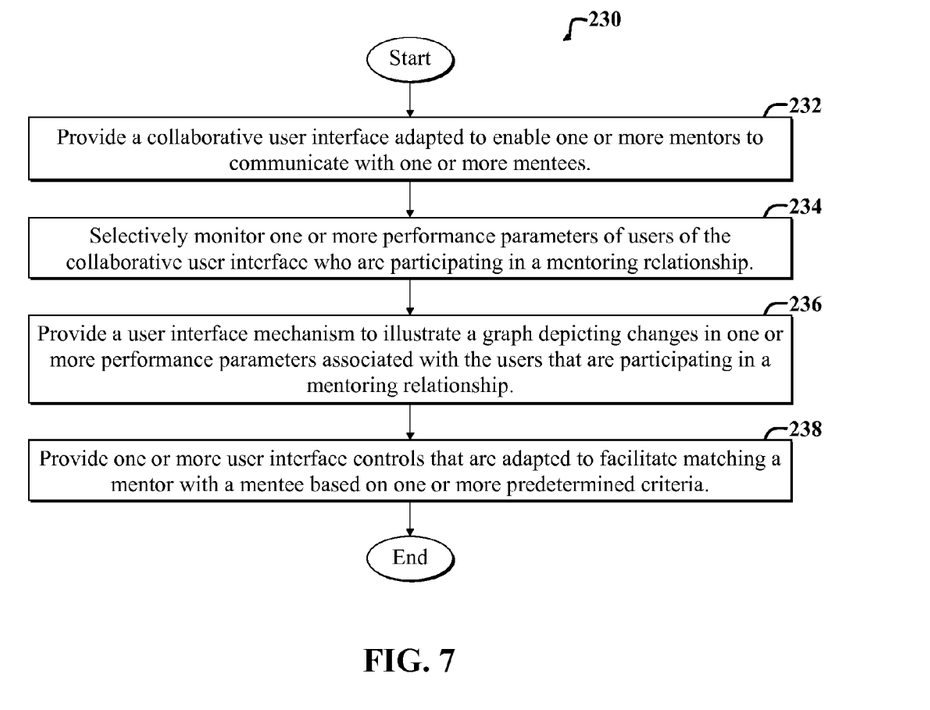
FIG. 7 is a flow diagram of a second example method adapted for use with the embodiments of FIGS. 1-5.

FIG. 7 is a flow diagram of a second example method 230 adapted for use with the embodiments of FIGS. 1-5. The second example method 230 is adapted to facilitating an enterprise mentoring program. An initial collaborative step 232 includes providing collaborative user interface adapted to enable one or mentors to communicate with one or more mentees. The collaborative user interface may include, for example, a section for indicating one or more social network relationships associated with a mentor or mentee and mechanisms for accessing shared work spaces, which may represent user interface mechanisms for sharing desktops or otherwise sharing work and information.

A subsequent monitoring step 234 includes selectively tracking or monitoring one or more performance parameters of users of the collaborative user interface who are participating in a mentoring relationship.

Next, an illustration step 236 includes providing a user interface mechanism to illustrate a graph depicting changes in one or more performance parameters associated with the users that are participating in a mentoring relationship.

An optional matching step 238 includes providing one or more user interface controls that are adapted to facilitate matching a mentor with a mentee based on one or more predetermined criteria. The matching step 238 may further include selectively retrieving preexisting data pertaining to a candidate mentor and a candidate mentee to facilitate matching the mentor with the mentee.

Note the methods 210, 230 may be adjusted or altered without departing from the scope of the present teachings. For example, the methods 210, 230 may be augmented with additional steps; steps may be reordered; or certain steps may be removed.

Hence, various embodiments discussed herein provide functionality, such as user interface mechanisms for implementing a mentoring program, which may allow Human Resources (HR) personnel of an enterprise to define a pool of participants, e.g., via information obtained during a talent review process; to integrate a questionnaire during a new hire process to facilitate understanding the needs, interests, and expertise of newly hired personnel; to leave the program open to anyone who wants to participate; to make public or keep private a mentor relationship between two individuals; to enable a enterprise personnel to specify a desire to be mentored and on what topics or knowledge areas; to enable enterprise personnel to specify a willingness to be a mentor and on what topics or knowledge areas; to match mentors and mentees based on profile information and social information, such as their interests, expertise, needs, goals, and responses to a questionnaire; to enable HR personnel to manually match mentors and mentees or to let the system suggest or determine matches; to create a collaborative charter for mentors and mentees to create tasks, schedule meetings, write notes, have secure discussions, identify learning goals, and so on.

Certain embodiments may be integrated with a Goals Management and Performance system, whereby a worker or other enterprise personnel can create a goal to be a mentor. Enterprise personnel may have the option to search for a mentor to help with a particular goal. An administrator or manager may have visibility into worker participation as a mentor or mentee, and so on.

Certain embodiments are adapted to provide analytics calculations and information, enabling users to pull reports to understand the effectiveness of the program, and so on. For example, performance ratings of enterprise personnel who have been mentored may be compared to rest of the company. In addition, if a given person, e.g., worker or employee, is promoted more quickly than others in the company, or if they are able to accomplish organizational goals quickly than others, these may indicate successes of the mentoring program.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device having computer readable program code embodied thereon, the computer readable program code including:

accessing storage that includes an association between a mentee-mentor match and a start and an end of the mentee-mentor match, wherein the mentee-mentor match is a match between a mentor and a mentee, includes an association between the mentee-mentor match and predetermined tasks, includes associations between the predetermined tasks and their respective completion, includes an association between the mentee and what performance metrics that have been assigned to the mentee, includes associations between the mentor and tags, availability information, location information, questionnaire data and predetermined performance metrics, and includes an association between the predetermined performance metrics and changes in the predetermined performance metrics;

collaborative user interface GUI (graphic user interface) that, when executed, communicates with an administrator user interface, mentor user interface and a mentee user interface;

a mentoring module that includes a mentor module and a mentee module, wherein the mentoring module when executed, stores retrieved mentor/mentee candidate information from a pre-existing human resources management application storing performance parameters and profile information of personnel of an organization maintained by the organization, with the candidate information including the performance parameters and the profile information, stores information received from the collaborative user interface GUI via the mentor user interface, and stores the tags, the availability information, the location information and the questionnaire data received from the collaborative user interface GUI via the mentee user interface;

tracking module that, when executed, tracks the start and the end of the mentee-mentor match, tracks when the predetermined tasks have been completed, and tracks the performance metrics that have been assigned to the mentee; and analytics module that, when executed, measures the changes in the predetermined performance measurements of the mentor and the mentee and pulls data from preexisting applications to calculate analytics with measurement and calculated analytics made available to the administrator user interface by the collaborative user interface GUI.

2. The non-transitory processor-readable storage device of claim 1 with the analytics module further including program code that, when executed, implements initiating an adjustment in compensation for the mentee when the change of a first performance parameter meets or exceeds a predetermined criterion to award an incentive.

3. The non-transitory processor-readable storage device of claim 2 wherein awarding the incentive includes automatically initiating an increase in compensation for the mentor when the first performance parameter of the mentee meets or exceeds a predetermined criterion.

4. The non-transitory processor-readable storage device of claim 2 wherein awarding the incentive includes:
adjusting a performance rating of the mentor based on the change of the first performance parameter.

5. The non-transitory processor-readable storage device of claim 1 with the collaborative user interface GUI further including program code that, when executed, implements an activity stream that provides the collaborative user interface GUI adapted to enable the mentor to communicate with the mentee.

6. The non-transitory processor-readable storage device of claim 5 wherein the collaborative user interface GUI includes a task-assignment control to allow the mentor to assign one or more tasks to the mentee.

7. The non-transitory processor-readable storage device of claim 5 wherein the collaborative user interface GUI includes a performance-rating control to allow the mentor to rate a performance of the mentee, resulting in a second performance parameter.

8. The non-transitory processor-readable storage device of claim 1 with the mentoring module further including program code that, when executed, retrieves preexisting profile information pertaining to a profile of each candidate mentor and each candidate mentee.

9. The non-transitory processor-readable storage device of claim 8 wherein the preexisting profile information includes data maintained by the human resource management application.

10. The non-transitory processor-readable storage device of claim 8 wherein the profile information includes information relating to a first performance parameter pertaining to each candidate mentee.

11. The non-transitory processor-readable storage device of claim 10 wherein the first performance parameter includes a measure of quota attainment pertaining to each candidate mentee who is a salesperson.

12. The non-transitory processor-readable storage device of claim 1 further including talent management computer code that, when executed, implements filtering a set of enterprise personnel based on one or more predetermined criteria to yield an initial set of candidate mentors and filtering a set of enterprise personnel based on one or more predetermined criteria to yield an initial set of candidate mentees.

13. The non-transitory processor-readable storage device of claim 12 wherein the one or more predetermined criteria include an indication of a particular skill or knowledge or lack thereof.

14. The non-transitory processor-readable storage device of claim 1 with the collaborative user interface GUI further including program code that, when executed, implements a search-tag user interface control to enable a candidate mentor to associate one or more search tags with himself/herself.

15. The non-transitory processor-readable storage device of claim 1 with the mentor user interface further including program code that, when executed, implements an availability-establishing user interface configured to allow a candidate mentor to indicate availability to act as the mentor.

16. The non-transitory processor-readable storage device of claim 1 with the mentee user interface further including program code that, when executed, implements a search-tag user interface to enable associating search tags with a candidate mentee.

17. The non-transitory processor-readable storage device of claim 1 with the collaborative user interface GUI further including program code that, when executed, implements a search interface to search for a candidate mentor or a candidate mentee matching one or more search criteria pertaining to one or more tags.

18. The non-transitory processor-readable storage device of claim 1 with the analytics module further including program code that, when executed, implements an indication of a remaining time interval during which the mentoring match will exist.

* * * * *

UNITED STATES PATENT AND TRADEMARK OFFICE
CERTIFICATE OF CORRECTION

PATENT NO. : 9,767,436 B2
APPLICATION NO. : 13/100142
DATED : September 19, 2017
INVENTOR(S) : Chenoweth et al.

It is certified that error appears in the above-identified patent and that said Letters Patent is hereby corrected as shown below:

In the Specification

In Column 5, Line 25, delete "mater," and insert -- matter, --, therefor.

In Column 8, Line 24, delete "persons" and insert -- person's --, therefor.

Signed and Sealed this
Twenty-second Day of May, 2018

Andrei Iancu
*Director of the United States Patent and Trademark Office*